United States Patent [19]
Mais et al.

[11] Patent Number: 5,911,962
[45] Date of Patent: Jun. 15, 1999

[54] PROCESS FOR THE PURIFICATION OF PHOSPHORUS OXYCHLORIDE

[75] Inventors: Franz-Josef Mais, Düsseldorf; Helmut Fiege, Leverkusen, both of Germany

[73] Assignee: Bayer Aktiengesellschaft, Germany

[21] Appl. No.: 09/113,988

[22] Filed: Jul. 10, 1998

[30] Foreign Application Priority Data

Jul. 15, 1997 [DE] Germany .......................... 197 30 224

[51] Int. Cl.$^6$ .................................................. C01B 25/10
[52] U.S. Cl. ........................................... 423/300; 544/334
[58] Field of Search ............................. 423/300; 544/334

[56] References Cited

U.S. PATENT DOCUMENTS

| | | | |
|---|---|---|---|
| 2,622,965 | 12/1952 | Tidwell | 423/300 |
| 4,178,353 | 12/1979 | Baker et al. | 423/300 |
| 5,677,453 | 10/1997 | Cramm et al. | 544/334 |
| 5,719,285 | 2/1998 | Steffan | 544/334 |
| 5,723,612 | 3/1998 | Huber et al. | 544/334 |

FOREIGN PATENT DOCUMENTS

| | | |
|---|---|---|
| 0 697 406 A1 | 8/1995 | European Pat. Off. . |
| 0 745 593 A2 | 5/1996 | European Pat. Off. . |
| 0 761 653 A1 | 8/1996 | European Pat. Off. . |
| 3908449 | 9/1990 | Germany ........................ 423/300 |
| 96/23776 | 8/1996 | WIPO . |

*Primary Examiner*—Ngoc-Yen Nguyen
*Attorney, Agent, or Firm*—Brinks Hofer Gilson & Lione

[57] ABSTRACT

Impure $POCl_3$ is purified by distillation in the presence of high-boiling nitrogen compounds from the group consisting of the substituted pyridines and pyrimidines, the open-chain and cyclic aliphatic amines, the open-chain and cyclic amidines, the guanidines and the aromatic amines.

16 Claims, No Drawings

5,911,962

PROCESS FOR THE PURIFICATION OF PHOSPHORUS OXYCHLORIDE

BACKGROUND OF THE INVENTION

The present invention relates to a process for the purification of impure phosphorus oxychloride ($POCl_3$), which would lead to products having an increased color number in the preparation of phosphorus esters. In particular, processes for the purification of impure $POCl_3$ which is formed as a co-product in the preparation of chlorinated nitrogen heterocycles are described.

The preparation of chlorinated N heterocycles, for example of polychloropyrimidines, by reaction of the corresponding polyhydroxypyrimidines with $PCl_5$ or $PCl_3+Cl_2$ is described in numerous patent applications, e.g. EP 697 406, WO 96/23776, EP 745 593 or EP 761 653. In this reaction, in addition to the chlorinated heterocycles, $POCl_3$ is also obtained as a co-product in amounts equivalent to the total of the chlorine atoms introduced. The use of this $POCl_3$ for further syntheses is urgently necessary from the economic and ecological point of view.

$POCl_3$ is employed in the chemical industry, inter alia, as an intermediate for the preparation of aliphatic or aromatic phosphates. In order to be usable, for example, as auxiliaries in the plastics or photographic industry, these phosphates must have no intrinsic color. Depending on the particular process, e.g. for the preparation of polychlorinated pyrimidines, the $POCl_3$ obtained here is impure to the extent that it cannot be utilized for the synthesis of phosphorus esters which can be used without restriction The $POCl_3$ distillate obtained from these processes typically contains impurities of similar boiling points which are composed of carbon, chlorine, oxygen or nitrogen removed by distillation.

These impurities lead to the increase in the color number in the phosphorus ester synthesis. Redistillation of the impure $POCl_3$, even through efficient columns, also does not lead to a satisfactory removal of the impurities. A process is therefore necessary with which the quality of the $POCl_3$ can be improved to the extent that it can be used without restriction for the preparation of phosphorus esters.

SUMMARY OF THE INVENTION

A process for the purification of $POCl_3$ has been found which comprises distilling the impure $POCl_3$ in the presence of high-boiling nitrogen compounds from the group consisting of the substituted pyridines and pyrimidines, the open-chain and cyclic aliphatic amines, the open-chain and cyclic amidines, the guanidines and the aromatic amines.

The purification relates in particular to $POCl_3$ from the synthesis of chlorinated N heterocycles.

DESCRIPTION OF THE INVENTION

Nitrogen compounds which can be employed according to the invention are those which have a sufficiently high boiling point and do not appear or only appear in the distillation according to the invention in traces as new impurities in the $POCl_3$ distillate. These are nitrogen compounds according to the invention having a boiling point of >140° C., preferably >170° C., particularly preferably >200° C. (all data at normal pressure). For simple handling, their melting point should be at most 60° C., preferably at most 40° C.

Examples which may be mentioned are: alkylpyridines or polyalkylated pyridines, such as 4-methylpyridine, 4-tert-butylpyridines, various positional isomers of dimethylpyridines, trialkylated pyridines, such as, for example, 2,4,6-trimethylpyridine etc., pyridines substituted by aryl groups, such as, for example, 2-, 3- or 4-phenylpyridine, the positional isomers of diphenylpyridines or triphenylpyridines such as, for example, 2,4,6-triphenylpyridine etc., pyridines substituted by fused rings, such as, for example, quinoline, isoquinoline, acridine. These named systems can be derivatized by further substituents. An example which may be mentioned is quinaldine or p-hydroxyquinoline. Oligo- and polypyridine derivatives are furthermore employable according to the invention, for example 2,2'-bipyridyl, 3,3'-bipyridyl, 4,4'-bipyridyl, 2,4'-bipyridyl, 2,6-bis(2-pyridyl)-pyridine, etc. Other examples of pyridine derivatives according to the invention are pyridines substituted by amino groups, for example 4-aminopyridine, 4-dimethylaminopyridine etc. Pyridine or oligo- and potypyridine derivatives which are substituted by mixed alkyl, aryl, amino and by fused rings can also be employed.

Examples of other high-boiling nitrogen compounds which can be employed according to the invention are the pyrimidines corresponding to the pyridines mentioned.

Other examples are: open-chain and cyclic aliphatic amines, open-chain and cyclic amidines or guanidines, such as trioctylamine, triisobutylamine, alkylpiperidines, diazabicyclo-nonane (DBN), diazabicyclo-undecane (DBU), tetramethylguanidine and analogous nitrogen compounds having suitable boiling points. Finally, aromatic amines, such as aniline, N-methyl-aniline and the like, are suitable.

According to the invention, an individual nitrogen compound or alternatively a mixture of a number of them can be employed. Preferred nitrogen compounds are pyridine derivatives and open-chain or cyclic amidines or guanidines.

According to the invention, in the batchwise procedure the addition of nitrogen compound to the impure $POCl_3$ is less than 10% by weight, preferably less than 5% by weight, particularly preferably less than 1% by weight. However, it is also possible to employ more than 10%, it then being possible in a continuous or semicontinuous form to use the high-boiling nitrogen compound several times as a distillation bottom. or to recyclize it.

The distillation according to the invention can be carried out at elevated, reduced or normal pressure; normal pressure is preferred. The process can be carried out batch-wise or continuously.

The distillation according to the invention can be carried out in various embodiments. As an example, the impure $POCl_3$ can be initially introduced. The nitrogen compound(s) according to the invention is/are then stirred in: after this, the purified $POCl_3$ is distilled off through a column. When using nitrogen compounds in the boiling point range from 140 to 200° C., the use of an efficient column to avoid nitrogen compounds in the $POCl_3$ distillate is advantageous. At boiling points of the nitrogen compounds of over 200° C., less efficient separating columns are already adequate. However, it is also possible to initially introduce the nitrogen compound and then to add the impure $POCl_3$ and to distill it off according to the invention from the mixture. In this context, a relatively large amount of nitrogen compound, e.g. 10% by weight or more, based on the amount of $POCl_3$, for example up to 50 or even 100% by weight, is advantageously initially introduced. If the $POCl_3$ distilled off here is replaced intermittently or continuously by further impure $POCl_3$, the process can be operated continuously until the bottom contains such a large quantity of impurities that these break through into the distillate. The exhausted nitrogen compound is disposed of professionally, e.g. by incineration with flue gas treatment. Finally, impure $POCl_3$ and nitrogen compound in the chosen weight ratio can be fed together or separately into a continuously operated distillation column, the purified distillate being removed as the top product and the nitrogen compound as the bottom product. The bottom product is recyclized and fed in again as nitrogen compound; a small part of the bottom is removed, disposed of and replaced by fresh nitrogen compound. When feeding in separately, the nitrogen compound is preferably fed in above the $POCl_3$.

The following examples illustrate the process according to the invention without restricting it thereto.

EXAMPLE A

Preparation of tricresyl phosphates (aromatic phosphate) from $POCl_3$ for color number determination A mixture of 200 g of m-cresol, 80 g of p-cresol and 50 g of phenol is treated with 0.1 g of MgO and treated with stirring with 153.5 g of the $POCl_3$ to be tested. After this, the mixture is heated with stirring (HCl evolution) to an internal temperature of 330 to 340° C. for 10 h. It is then cooled slightly and distilled at 10 mbar. The product passes over in the top temperature range from 230 to 270° C. This main run is washed twice at 60° C. with 100 ml of 0.1 N NaOH and twice with 100 ml of water. The moist tricresyl phosphate phase is then dried at ~100° C. in a water-jet vacuum. The color number of the dried aromatic phosphate is determined.

EXAMPLE B

Preparation of trichloropropyl phosphate (aliphatic phosphate) from $POCl_3$ for color number determination 153.5 g of the $POCl_3$ to be tested are initially introduced and treated at room temperature with 0.8 g of $TiCl_4$. After this, 232 ml of propylene oxide are added dropwise in the course of 1 h. The internal temperature is kept at ~80° C. by external cooling. The mixture is then stirred at 80° C. for 1 h and a water-jet vacuum is finally applied to remove propylene oxide residues. After this, the mixture is washed once at 80° C. with 100 ml of 0.1N HCl, once with 100 ml of water, once with 0.1N NaOH and once with 100 ml of water. Finally, a water-jet vacuum is applied at ~90 to 100° C., to dry the product. The color number of the dried aliphatic phosphate is determined.

EXAMPLE 1

153 g of a $POCl_3$ distillate from the production of dichloropyrimidines, which according to Example A) had a color number of 180 Hazen and according to Example B) a color number of 380 Hazen, was treated with 1.0% by weight of quinoline and refluxed for 1 h. 144 g of colorless distillate were then distilled off at normal pressure (top temperature at 106° C.) through a 10 cm long column. The color number according to Example B) was 40 Hazen and according to Example A) 20 Hazen.

EXAMPLE 2

Repetition of Example 1 using 1.0% by weight of quinaldine instead of quinoline afforded 145 g of colorless $POCl_3$ distillate which according to Example B) gave 35 Hazen as the color number.

EXAMPLE 3

1000 g of $POCl_3$ of Example 1 were treated with 10 g of collidine and distilled through a 1 m long packed column at normal pressure (top temperature about 105° C.). 955 g of a colorless distillate were obtained. The color number determination according to Example A) gave 15 Hazen and according to Example B) 25 Hazen.

EXAMPLES 4 TO 6

153 g of a $POCl_3$ distillate from the production of dichloropyrimidines, which according to Example B) had 430 Hazen as a color number, was treated in each case with 1.0% by weight of 4-phenylpyridine, 4-dimethylaminopyridine or 2,2'-dipyridyl. After distillation analogously to Example 1, 35 Hazen, 30 Hazen and 45 Hazen were obtained in color number determinations according to Example B).

EXAMPLE 7

500 g of a $POCl_3$ distillate from the production of trichloropyrimidine, which according to Example B) had 280 Hazen as a color number, was purified analogously to Example 1 using 1.0% by weight of quinoline. After the distillation, the color number according to Example B) was 20 Hazen.

What is claimed is:

1. A process for the purification of $POCl_3$, which comprises distilling impure $POCl_3$ in the presence of an added amount of a high-boiling nitrogen compound selected from the group consisting of substituted pyridines, and substituted pyrimidines, open-chain aliphatic amines, cyclic aliphatic amines, open-chain amidines, cyclic amidines, guanidines and aromatic amines, wherein the nitrogen compound has a boiling point of above 140° C. at normal pressure.

2. The process as claimed in claim 1, wherein the impure $POCl_3$ is a $POCl_3$ distillate obtained from a production of chlorinated N-heterocycles.

3. The process as claimed in claim 1, wherein the nitrogen compound is a substituted pyridine.

4. The process as claimed in claim 1, wherein the nitrogen compound employed is a substituted open-chain amidine, a cyclic amidine, or a guanidine.

5. The process as claimed in claim 1, wherein the process is a batch process and less than 10% by weight of the nitrogen compound is employed, based on the amount of the impure $POCl_3$.

6. The process as claimed in claim 1, wherein the process is a continuous process.

7. The process as claimed in claim 1, wherein the nitrogen compound has a boiling point of above 170° C. at normal pressure.

8. The process as claimed in claim 7, wherein the nitrogen compound has a boiling point of above 200° C. at normal pressure.

9. The process as claimed in claim 3, wherein the nitrogen compound is selected from the group consisting of 4-methylpyridine, 4-t-butylpyridine, a positional isomer of dimethylpyridine, a trialkylated pyridine, an aryl-substituted pyridine, a positional isomer of diphenylpyridine, a positional isomer of triphenylpyridine, and an amino-substituted pyridine.

10. The process as claimed in claim 3, wherein the nitrogen compound is 4-methylpyridine, 4-t-butylpyridine, 2,4,6-trimethylpyridine, 2-phenylpyridine, 3-phenylpyridine, 4-phenylpyridine, 2,4,6-triphenylpyridine, quinoline, isoquinoline, acridine, quinaldine, p-hydroxyquinoline, 2,2'-bipyridyl, 3,3'-bipyridyl, 4,4'-bipyridyl, 2,4'-bipyridyl, 2,6-bis(2-pyridyl)-pyridine, 4-aminopyridine, or 4-dimethylaminopyridine.

11. The process as claimed in claim 4, wherein the nitrogen compound is trioctylamine, triisobutylamine, an alkylpiperidine, diaza-bicyclo-nonane, diazabicyclo-undecane, or tetramethylguanidine.

12. The process as claimed in claim 5, wherein less than 5% by weight of a nitrogen compound is employed, based on the amount of $POCl_3$ to be purified.

13. The process as claimed in claim 12, wherein less than 1% by weight of a nitrogen compound is employed, based on the amount of $POCl_3$ to be purified.

14. The process as claimed in claim 6, wherein 10 to 100% by weight of a nitrogen compound, based on the amount of impure $POCl_3$ used at the start of the continuous process, is employed.

15. The process as claimed in claim 6, wherein the continuous process is maintained until the nitrogen compound is exhausted.

16. The process as claimed in claim 2, wherein the impure $POCl_3$ is obtained as a co-product in the preparation of chlorinated N-heterocycles.

\* \* \* \* \*